Jan. 7, 1936.                J. A. LAUBER ET AL                2,027,109
                              EYEGLASS CONSTRUCTION
                               Filed Nov. 12, 1934
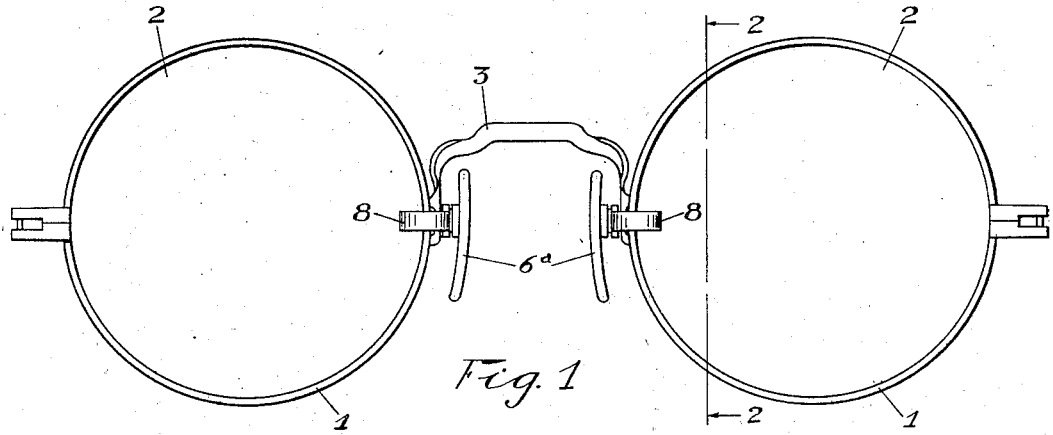
Fig. 1
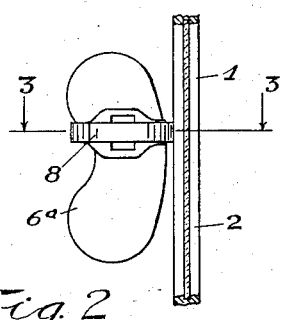
Fig. 2
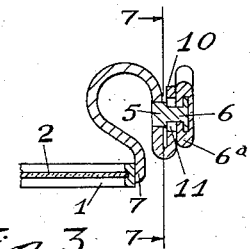
Fig. 3
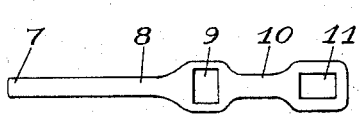
Fig. 8
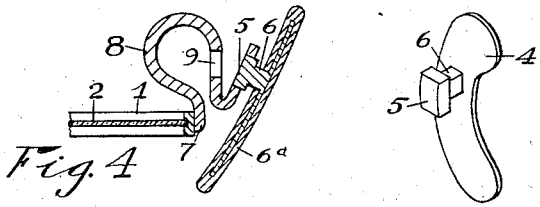
Fig. 4
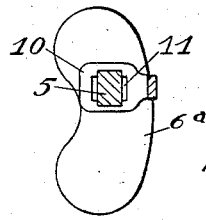
Fig. 6
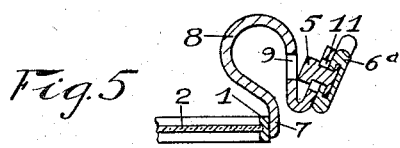
Fig. 5
Fig. 7
INVENTORS
John A. Lauber AND
BY Rene M. Schupbach
Harold E. Stonebraker
ATTORNEY

Patented Jan. 7, 1936

2,027,109

UNITED STATES PATENT OFFICE 2,027,109

EYEGLASS CONSTRUCTION

John A. Lauber and Rene M. Schupbach, Rochester, N. Y., assignors to Continental Optical Company, Inc., Rochester, N. Y., a corporation of Indiana Application November 12, 1934, Serial No. 752,617

4 Claims. (Cl. 88—48)

This invention relates to an eyeglass construction, and more particularly to an arrangement of nose pad and structure for mounting it on an eyeglass frame.

A more particular object of the invention is to provide a simple and practical construction whereby a nose pad can be readily removed from the frame and a new pad assembled, thus effecting a substantial saving by eliminating the necessity of discarding the frame when a pad is injured and requires replacement.

A further purpose of the invention is to provide an arrangement whereby a nose pad can be quickly and securely fastened on a frame by the operator, and can be readily removed if it is desired to reverse the position of the pads or for any other reason.

Still a further object of the invention is to accomplish the purposes set forth with a structure possessing a minimum number of parts and which can be manufactured at a low cost while at the same time affording a practical device that will hold the pad in proper relation to the frame.

To these and other ends, the invention consists in the construction and arrangement of parts that will appear from the following description when read in conjunction with the accompanying drawing, the novel features being pointed out in the claims following the specification.

In the drawing:

Fig. 1 is a front elevation of an eyeglass frame equipped with a preferred embodiment of the invention;

Fig. 2 is a sectional view on line 2—2 of Fig. 1, showing the pad and supporting arm in side elevation;

Fig. 3 is a sectional view on line 3—3 of Fig. 2;

Fig. 4 is a sectional view similar to Fig. 3, showing the position of the pad when initially inserted into the locking portion of the supporting arm;

Fig. 5 is a view similar to Fig. 4 after the pad is inserted through the locking portion and is turned ready for insertion into the body portion of the supporting arm as the locking portion is bent toward the body portion;

Fig. 6 is a perspective view of the pad;

Fig. 7 is a sectional view on line 7—7 of Fig. 3, and

Fig. 8 is a detail elevation of the blank from which the supporting arm is formed.

Referring more particularly to the drawing, in which like reference characters refer to the same parts throughout the several views, 1 designate the lens rims, 2 are the lenses, and 3 a bridge of conventional form of frame in which the pad supporting arms are carried by the lens rim 1, although it will be understood that the pad supporting arms may be directly attached to the bridge or otherwise permanently mounted on the frame, as well known in this art, and this arrangement does not form any particular part of the invention which has to do only with the construction and relation between the nose pad and the arm on which the nose pad is mounted, as will now be described.

Since the construction of the two nose pads is the same, it will be necessary to describe only one of these, each pad comprising a plate preferably formed of metal and of any desired contour as designated at 4. The plate 4 carries a lug, preferably formed integral therewith and extending from one face, and including an oblong shaped enlarged portion or head 5 connected with the plate 4 by a reduced portion or neck 6.

It will be understood that the plate 4 may be surrounded by a zylonite, celluloid or other facing or covering 6ª, as usual in the art, in order to afford a suitable surface for contact with the nose of the wearer, although the metal plate 4 may be so constructed and formed as to contact directly with the nose, and so far as the present invention is concerned, it makes no difference whether the surface which engages the nose is of metal or other material.

The pad, or plate 4, is attached to the frame in such a way as to permit its ready removal if desired, and to this end there is afforded a pad supporting arm, the inner end of which, designated at 7, is rigidly secured to the lens rim 1 or otherwise attached to the frame. The pad supporting arm includes a body portion 8 having an opening 9 of the same oblong conformation as that of the enlarged head 5 of the pad lug. The pad supporting arm carries means for holding the lug in said opening, and to this end preferably includes also a locking end portion 10 which has an opening 11 therein also of the same oblong shape as the enlarged head 5 of the pad lug but disposed as shown in Fig. 8 at an angle to the opening 9 for a purpose that will appear presently.

The pad supporting arm is formed of metal or suitable material that permits it to be readily bent and which will hold the established relation after being so bent against any accidental displacement, and the locking portion of the supporting arm is shaped so as to occupy the position indicated in Figs. 4 and 5 before attachment of the pad, the locking end portion 11 being then in angular relation to the body portion in which the opening 9 is located.

With the parts in this position, the head 5 of the lug is inserted through opening 11 of the locking portion until it entirely clears said opening, as shown in Fig. 5. The pad and lug can then be turned through the necessary angle to bring the head 5 into registry with the opening 9, and thereupon the pad and locking portion 11 are forced toward the body portion of the arm. As the operator bends the locking portion toward the body portion of the arm, the head 5 enters the opening 9 and the parts assume the position shown in Fig. 3, from which it will be seen that the locking portion 10 occupies a position between the body portion of the supporting arm and the pad, in substantially parallel relation to the adjacent part of the supporting arm.

The opening 11 of the locking portion surrounds the neck or reduced portion 6 of the lug, and when the parts are in this position, the lengthwise axis of the head 5 is disposed at an angle to the lengthwise axis of the opening 11 in the locking portion. The locking portion thus engages the adjacent or inner face of the head 5 of the lug and prevents the latter from accidentally moving out of the opening 9.

When it in desired to remove the pad, either for the purpose of reversing pads on the frame or when a pad is damaged and requires replacement, it is only necessary to bend the locking portion 11 away from the body portion of the supporting arm by a suitable tool inserted therebetween, moving the locking portion to the position shown in Figs. 4 and 5, whereupon the head 5 can be removed from the opening 7 and turned so as to bring the head 5 into registry with the opening 11, thus permitting its entire removal from the supporting arm, and a new pad can then be inserted in the manner already described.

While the invention has been described with reference to a particular construction, it is not confined to the precise details or arrangement herein disclosed, and this application is intended to cover such changes or modifications as may come within the purposes of the improvement or the scope of the following claims.

We claim:

1. In an eyeglass construction, the combination with a nose pad and an oblong shaped lug carried thereby, of a supporting arm including a body portion having an oblong shaped opening to conform to said lug and a locking end portion formed integral with and bent upon said body portion and having an oblong shaped opening shaped to conform to said lug, the openings in said end and body portions being angularly disposed in relation to each other so that the lug after being inserted through the locking portion must be turned partially before insertion into the body portion, said locking portion occupying a position between the pad and the body portion of the locking arm substantially parallel with the latter when the parts are in final position and acting to prevent removal of the lug from said opening in the body portion.

2. In an eyeglass construction, the combination with a nose pad and an oblong shaped lug carried thereby, said lug including an enlarged head and a reduced neck, of a pad supporting arm including a body portion having an oblong shaped opening to receive said enlarged head and a locking end portion formed integral with and bent upon said body portion and having an oblong shaped opening through which said enlarged head is insertable before entering the opening in the body portion, said openings conforming to the shape of the head and being so disposed with relation to each other that after the head is inserted through the opening in the locking portion it must be turned partially before entering the opening in the body portion of the supporting arm, the locking end portion occupying a position between the body portion and the pad when the parts are in final position and engageable with the adjacent face of the enlarged head to prevent removal of the latter from the supporting arm.

3. In an eyeglass construction, the combination with a nose pad and a lug carried thereby, said lug including an enlarged head of irregular conformation and a reduced neck, of a pad supporting arm having an opening conforming to said head, and a locking end portion formed integral with and bent upon the body of the pad supporting arm and having an opening conforming to said head and disposed angularly to the first mentioned opening, the locking portion engaging the adjacent face of said head when the parts are in final position to prevent removal of the head from the body portion of the locking arm and said neck extending through the opening in the locking portion.

4. In an eyeglass construction, the combination with a nose pad and a lug carried thereby, said lug including an enlarged head of irregular conformation and a reduced neck, of a pad supporting arm including a body portion and an end portion formed integral with and bent upon the body portion, said body portion and end portion both having openings conforming to said head and disposed in angular relation to each other, one of said portions engaging the adjacent face of said head when the parts are in final position and preventing removal of the head from the opening in the other of said portions, and said neck extending through the opening in said portion which engages the face of the head.

JOHN A. LAUBER.
RENE M. SCHUPBACH.